United States Patent
Kovacs et al.

(10) Patent No.: US 9,198,185 B2
(45) Date of Patent: Nov. 24, 2015

(54) MECHANISM FOR AGGREGATING UPLINK INTERFERENCE INFORMATION FOR USE IN MULTI-CARRIER SYSTEMS

(75) Inventors: Istvan Zsolt Kovacs, Aalborg (DK); Frank Frederiksen, Klarup (DK); Klaus Ingemann Pedersen, Aalborg (DK); Luis Garcia, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 322 days.

(21) Appl. No.: 13/577,979

(22) PCT Filed: Feb. 10, 2010

(86) PCT No.: PCT/EP2010/051662
§ 371 (c)(1),
(2), (4) Date: Sep. 10, 2012

(87) PCT Pub. No.: WO2011/098121
PCT Pub. Date: Aug. 18, 2011

(65) Prior Publication Data
US 2013/0003580 A1    Jan. 3, 2013

(51) Int. Cl.
| | |
|---|---|
| *H04B 7/216* | (2006.01) |
| *H04W 72/08* | (2009.01) |
| *H04B 1/707* | (2011.01) |
| *H04W 24/02* | (2009.01) |
| *H04W 72/04* | (2009.01) |

(Continued)

(52) U.S. Cl.
CPC .............. *H04W 72/082* (2013.01); *H04B 1/707* (2013.01); *H04L 5/001* (2013.01); *H04L 5/0073* (2013.01); *H04L 5/0091* (2013.01); *H04W 24/02* (2013.01); *H04W 72/0413* (2013.01); *H04W 84/045* (2013.01)

(58) Field of Classification Search
USPC .................... 370/335, 395.21, 395.4, 395.64, 370/395.65; 375/E7.14, E7.148, E7.211, 375/E7.22, E7.232, E7.278; 709/247
See application file for complete search history.

(56) References Cited

U.S. PATENT DOCUMENTS

| | | | |
|---|---|---|---|
| 2008/0247375 A1* | 10/2008 | Muharemovic et al. | 370/344 |
| 2011/0039589 A1* | 2/2011 | Skov | 455/501 |

(Continued)

OTHER PUBLICATIONS

Garcia, et al., "Autonomous Component Carrier Selection for Local Area Uncoordinated Deployment of LTE-Advanced", © 2009 IEEE, (5 pages).

Garcia, Luis S.U., et al., "Autonomous Component Carrier Selection: Interference Management in Local Area Environments for LTE-Advanced", © 2009 IEEE, pp. 110-116.

(Continued)

*Primary Examiner* — Phuongchau Ba Nguyen
(74) *Attorney, Agent, or Firm* — Harrington & Smith

(57) ABSTRACT

There is proposed a mechanism by means of which information can be generated and used for estimating and identifying at each base transceiver station of a communication network the set of other base transceiver stations generating interference on certain monitored component carriers used by the base transceiver station, i.e. information for the generation of the incoming uplink background interference matrix. For this purpose, a specific communication information set, referred to as uplink radio load map, is determined which informs about an average (time/frequency) and aggregated (over all or group of served UEs) uplink load measure per component carrier. Based on the uplink radio load map received via suitable signaling from other base transceiver stations, each base transceiver station can determine the incoming uplink background interference matrix and initiate, if necessary, suitable measures for reducing interference per component carrier.

16 Claims, 4 Drawing Sheets

(51) Int. Cl.
  *H04W 84/04*  (2009.01)
  *H04L 5/00*  (2006.01)

(56) References Cited

U.S. PATENT DOCUMENTS

2011/0199985 A1* 8/2011 Cai et al. .................. 370/329
2013/0003580 A1* 1/2013 Kovacs et al. ............. 370/252

OTHER PUBLICATIONS

R1-094659, 3GPP TSG RAN WG1 #59 Meeting, Jeju, South Korea, Nov. 9-13, 2009, "Autonomous CC selection for heterogeneous environments", Nokia Siemens Networks, Nokia, 4 pgs.
R1-091779, 3GPP TSG RAN WG1 #57 Meeting, US, San Francisco, May 4-8, 2009, Primary Component Carrier Selection, Monitoring, and Recovery, Nokia Siemens Networks, Nokia, 6 pgs.

* cited by examiner

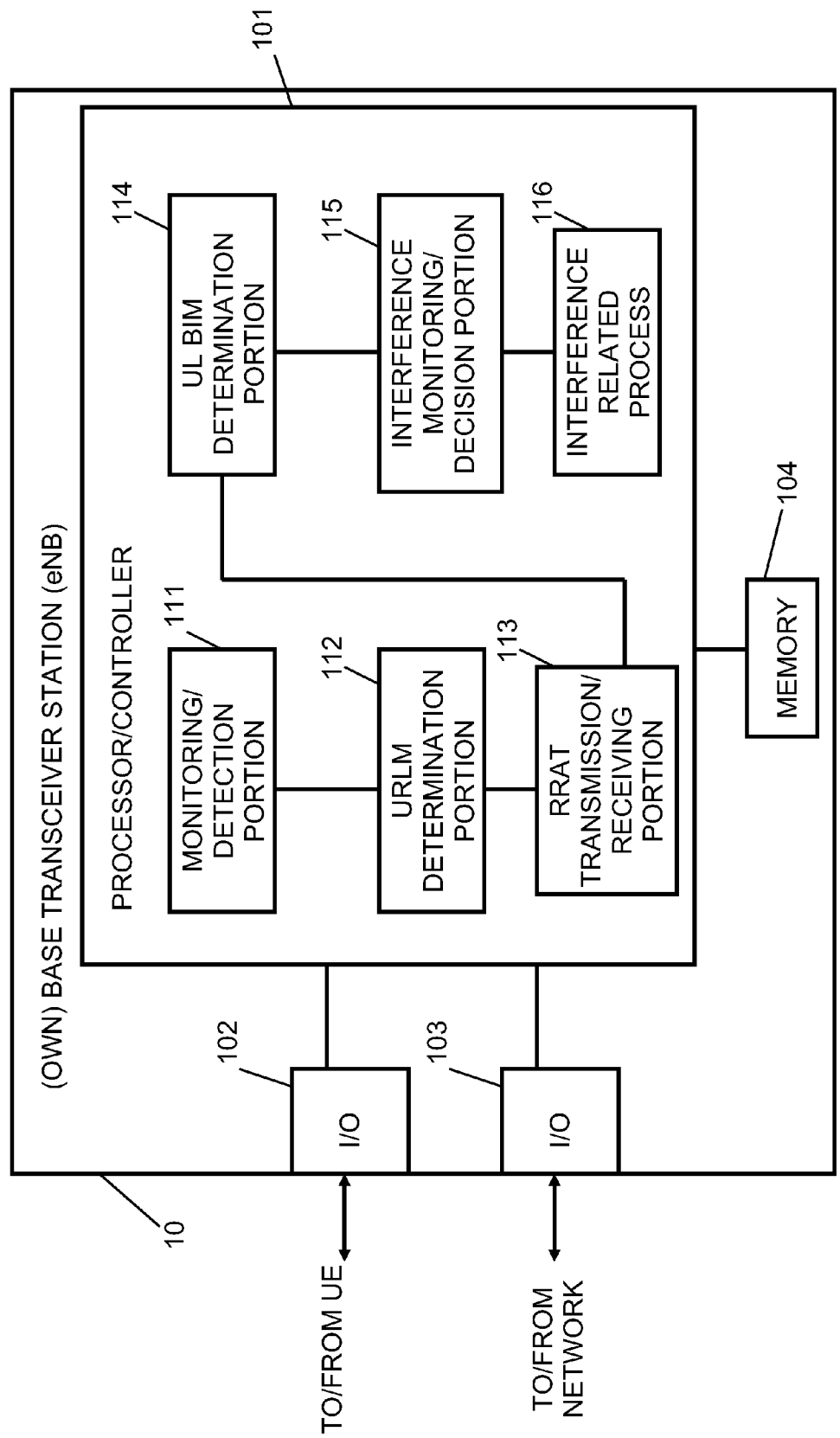

MECHANISM FOR AGGREGATING UPLINK INTERFERENCE INFORMATION FOR USE IN MULTI-CARRIER SYSTEMS

BACKGROUND OF THE INVENTION

1. Field of the Invention

The present invention relates to a method, apparatus and computer program product providing a mechanism for providing aggregate information used for interference considerations in multi-carrier or multi-component carrier systems, in particular with regard to uplink direction.

2. Related background Art the following meanings for the abbreviations used in this specification apply:
3GPP—3rd generation partnership project
ACCS—autonomous component carrier selection
BIM—background interference matrix
CC—component carrier
DL—downlink
eNB—enhanced node B (LTE base station)
HeNB—home eNB
IoT—interference over thermal noise
IP—Internet Protocol
LTE—Long Term Evolution
LTE-A—LTE-advanced
PCC—primary component carrier
PSD—power spectral density
RRAT—radio resource allocation table
RSRP—reference signal received power
RSRQ—reference signal received quality
SCC—secondary component carrier
UE—user equipment
UL—uplink
URLM—uplink radio load map In the last years, an increasing extension of communication networks, e.g. of wire based communication networks, such as the Integrated Services Digital Network (ISDN), DSL, or wireless communication networks, such as the cdma2000 (code division multiple access) system, cellular 3rd generation (3G) communication networks like the Universal Mobile Telecommunications System (UMTS), cellular 2nd generation (2G) communication networks like the Global System for Mobile communications (GSM), the General Packet Radio System (GPRS), the Enhanced Data Rates for Global Evolutions (EDGE), or other wireless communication system, such as the Wireless Local Area Network (WLAN) or Worldwide Interoperability for Microwave Access (WiMAX), took place all over the world. Various organizations, such as the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards for telecommunication network and access environments.

Generally, for properly establishing and handling a communication connection between network elements such as a UE and another communication equipment, such as a database, a server, etc., one or more intermediate network elements, such as base transceiver stations, network control elements, support nodes, service nodes and interworking elements are involved which may belong to different communication networks.

In particular in wireless communication networks, it is important to use the available limited resources, in particular with regard to bandwidth, channel capacity etc. as good as possible so as to achieve a good balance between provided service or connection quality and degree of capacity utilization. In order to achieve this, substantial planning and simulation efforts are taken so as to ensure that a deployed network infrastructure is able to provide good service performance and to minimize interference issues, and the like.

One new approach to further develop telecommunication networks is the installation of so-called low-power base stations, which are also commonly referred to as "femto-cells" or home eNB (HeNB). Such low-power base stations are advantageous in that they are low-cost and possibly user-deployed cellular base stations offering higher capacity per area as compared to macro cells, arising from using smaller cell sizes and more efficient spatial reuse. According to current considerations, as done for example by 3GPP, corresponding low-power base stations or HeNBs may appear like a normal (macro cell) base stations (for example like an eNB) for UEs so that there are no changes necessary in the UEs.

However, despite the benefits achievable by installing such HeNBs, there may arise also problems which have to be considered for guaranteeing proper functioning of telecommunication networks. For example, issues regarding interference management and efficient system operation are to be considered.

Uncoordinated deployments of eNBs (such as HeNBs) in local area environments can benefit from having support for dynamic frequency re-use mechanisms. Such schemes are based on a mechanism where each base transceiver station, such as an eNB or a HeNB, dynamically selects to use only a subset of the available component carriers (i.e. using from one component carrier up to the maximum number of available component carriers). Examples for such schemes planned to be used, for example, in LTE or LTE-A network systems are referred to, for example, as "autonomous component carrier selection" (ACCS) or "dynamic management of frequency band resources". In the following, a corresponding scheme will be referred to as ACCS.

The ACCS scheme provides an automatic and fully distributed mechanism for dynamic frequency re-use on a component carrier resolution. In principle, each component carrier is eligible for use in any cell. However, for this purpose, it has to be ensured that certain signal to interference plus noise ratio (SINR) constraints are satisfied.

Thus, in order to ensure the long-term 'quality' of the radio link on a component carrier allocated to or used by a base transceiver station (i.e. a maximum tolerable inter-cell interference) and minimize its reconfiguration frequency as much as possible while still providing full cell coverage, certain radio monitoring and CC recovery procedures are required. These procedures have to be performed for both DL and UL traffic on the component carrier.

However, it has been found out that in particular for the UL traffic, the aggregation and processing of information usable for a detailed and useful interference analysis are difficult. This is, for example, due to the distributed nature of the interference, originating from all the UEs served by neighboring base transceiver stations, such as eNBs. Specifically, the identification (ID) of such UEs are known only in their own serving eNBs. Due to a limited signaling between eNBs, detailed per-UE information may be prevented to be exchanged in the entire network of deployed eNBs. Thus an UL interference characterization is in general difficult to achieve and can only be based, for example, on additional but limited information exchange between eNBs.

SUMMARY OF THE INVENTION

Thus, it is an object of the invention to provide an apparatus, method and computer program product by means of which provision of information usable for interference considerations or characterization in multi-carrier systems is achieved, in particular with regard to uplink direction.

Furthermore, it is an object of the invention to provide a mechanism by means of which corresponding information provided by other network elements are used for the interference considerations or characterization in multi-carrier systems.

These objects are achieved by the measures defined in the attached claims.

According to an example of the proposed solution, there is provided, for example, a method comprising monitoring uplink and downlink interference parameters on at least one specified component carrier used by an own base transceiver station of a communication network, and determining a communication information set indicating an uplink load measure for each of the at least one specified component carrier, the communication information set comprising information elements based on the monitored interference parameters and on transmission power values.

Furthermore, according to an example of the proposed solution, there is provided, for example, an apparatus comprising a detector configured to monitor uplink and downlink interference parameters on at least one specified component carrier used by an own base transceiver station of a communication network, and a processor configured to determine a communication information set indicating an uplink load measure for each of the at least one specified component carrier, the communication information set comprising information elements based on the monitored interference parameters and on transmission power values.

According to further refinements, there may be comprised one or more of the following features:

the at least one specified component carrier may comprise a primary component carrier used by the own base transceiver station, or the at least one specified component carrier may comprise a primary component carrier and at least one secondary component carrier used by the own base transceiver station;

the determination may further comprise executing a first estimation of an aggregated path loss value towards neighboring base transceiver stations for each of the at least one specified component carrier; then, in addition, the first estimation may be based on at least one of incoming downlink background interference information received from the neighboring base transceiver stations and downlink interfering receiver signal levels reported by user equipments served by the own base transceiver station;

the determination may further comprise executing a second estimation of an average aggregated uplink transmit power density for each of the at least one specified component carrier; then, in addition, the second estimation may be based on at least one of information aggregated from user equipments served by the own base transceiver stations, and power control parameter information stored in the own base transceiver station;

the information elements of the communication information set may be provided in a quantized format, wherein each of the quantized information elements may indicate a preset range of values of a totality of values estimated;

in the communication information set, there may be included indicators related to a cell edge load and a cell-average load of the own base transceiver station;

the communication information set may be transmitted from the own base transceiver station to neighboring base transceiver stations; then, in addition, for transmitting the communication information set from the own base transceiver station to neighboring base transceiver stations, the communication information set may be included in a message used for informing about a radio resource allocation of the own base transceiver station;

in the own base transceiver station, at least one communication information set indicating an uplink load measure for each of at least one component carrier used by a foreign base transceiver station may be received, the received at least one communication information set may be processed, and uplink background interference information may be determined on the basis of the processing; then, in addition, an uplink interference level for the at least one specified component carrier used by the own base transceiver station may be monitored on the basis of the determined uplink background interference information, it may be decided whether or not an interference level for the at least one specified component carrier is higher than a predetermined threshold, and, in case the decision is positive, an interference related processing may be executed on the basis of the uplink background interference information; then, in addition, the interference related processing may comprise at least one of indentifying the strongest source of interference from the uplink background interference information and sending an interference reduction request signal to the identified source, and/or initiating a component carrier recovery procedure for the at least one specified component carrier used by the own base transceiver station, and/or initiate a component carrier reselection procedure the at least one specified component carrier used by the own base transceiver station, and/or initiate a component carrier coalition formation procedure including the at least one specified component carrier used by the own base transceiver station.

Moreover, according to another example of the proposed solution, there is provided, for example, a computer program product for a computer, comprising software code portions for performing the steps of the above defined method, when said product is run on the computer. The computer program product may comprise a computer-readable medium on which said software code portions are stored. Furthermore, the computer program product may be directly loadable into the internal memory of the computer and/or transmittable via a network by means of at least one of upload, download and push procedures.

By virtue of the proposed solutions, it is possible to provide a distributed and scalable rule for generating a communication information set which indicates an average (time/frequency) and aggregated (over all or group of served UEs) UL load measure per CC (the communication information set is also referred to hereinafter as UL radio load map (URLM)), which rule is easily implementable and executable in base transceiver stations of any type (such as eNB or HeNB, for example).

Furthermore, it is possible to signal the communication information (URLM) set in a simple distributed and scalable manner, for example by means of messages already established and used for wired or wireless communication between corresponding network elements like base transceiver stations (an example for such a message used in ACCS schemes to be employed in LTE or LTE-A networks are broadcasted RRAT messages).

Similar to the distributed and scalable rule for generating the communication information set, it is also possible to implement by means of the present invention an aggregation procedure for the received URLM information at each eNB in order to determine and create uplink background interference information, such as an UL BIM. Thus, it is possible to decide on accurate information about further actions, depending on a detection of a situation where an interference level for the CC(s) in question indicates the need for such actions, such as CC recovery procedure(s) (e.g. for the PCC) and/or CC (re) selection and/or CC coalition formation (e.g. for SCC).

In addition, the communication information set (e.g. the URLM) generated according to the present invention represents only mid-term or long-term information. Hence, a signaling of this information set does not require significant bandwidth. Thus, the implementation is feasible also for the case of Over the Air Communication (OTAC) like schemes.

Moreover, the information elements included in the communication information set, such as aggregated path loss values towards neighboring base transceiver stations (PL_aggr values) or average aggregated uplink transmit power density values (PSD_aggr values) can be further processed by quantizing them before including them in the RRAT, wherein the quantizing may follow a specified rule. For example, instead of quantizing the full values, only a given range is indicated based on pre-defined PSD and PL thresholds (similar to standardized RSRP, RSRQ reports).

Furthermore, the proposed mechanism is usable in a general manner for all component carriers to be considered by the base transceiver station. In other words, URLM information (and UL BIM) as described above can be used, for example, for PCC, SCC or any groups of CCs and also for the UE-group specific UL SCC allocation.

Furthermore, the communication information set is easily extendible to provide additional information. For example, the URLM can be extended with extra dimensions, e.g. including both cell-edge load and cell-average load indicators. Other combinations are also easily implementable and may consider the actual signaling bandwidth available for e.g. the RRAT messages.

The above and still further objects, features and advantages of the invention will become more apparent upon referring to the description and the accompanying drawings.

BRIEF DESCRIPTION OF THE DRAWINGS

FIG. 4 shows a diagram illustrating a configuration of a network device executing a procedure for generating and using a communication information set related to interference provided according to examples of embodiments of the invention.

Figure 1:
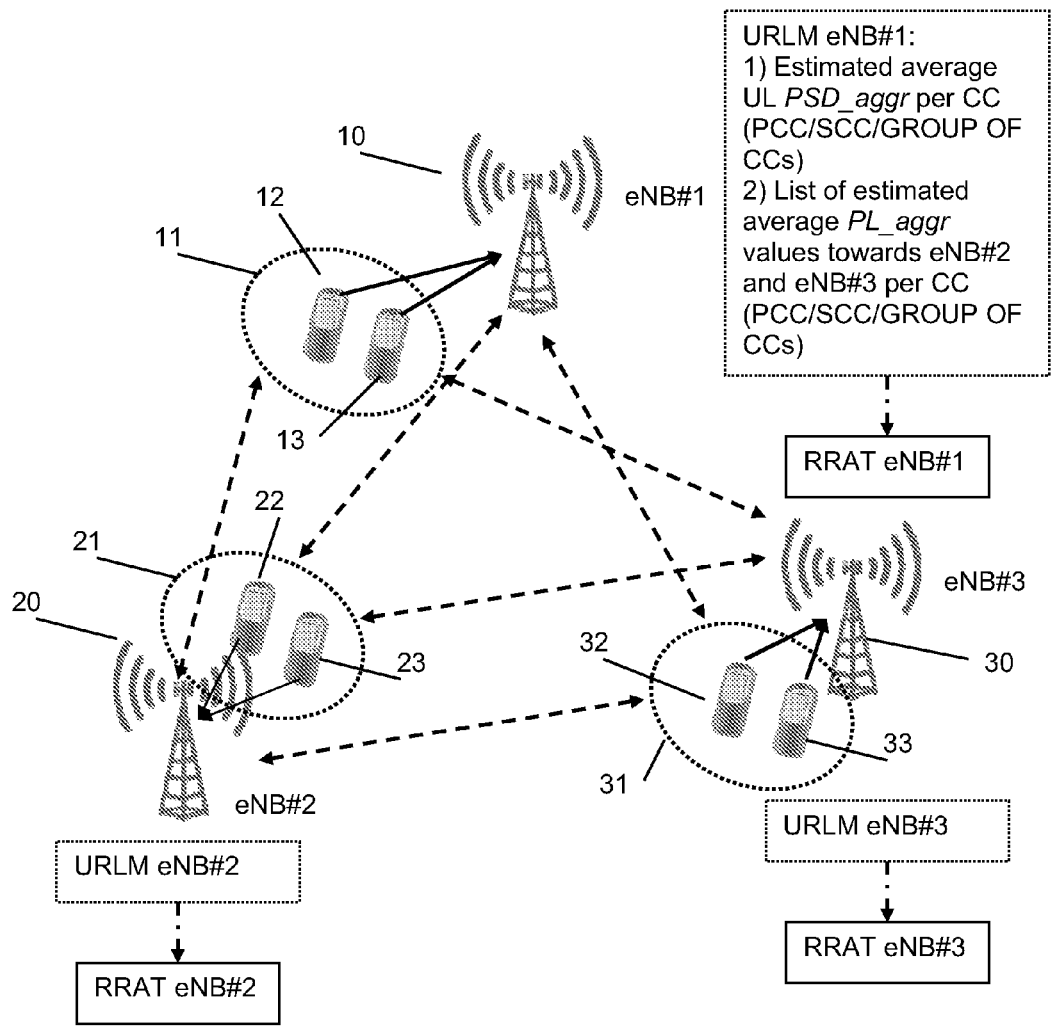
FIG. 1 shows a diagram illustrating a simplified example of a communication network architecture including three base transceiver stations according to examples of embodiments of the invention.

DESCRIPTION OF PREFERRED
EMBODIMENTS

In the following, examples and embodiments of the present invention are described with reference to the drawings. For illustrating the present invention, the examples and embodiments will be described in connection with a communication system which may be based on a 3GPP LTE or LTE-A system where different users or subscribers using a respective UE are able to establish a connection with the network by means of different base transceiver stations. Those base transceiver stations may be, for example, macro cell eNBs or femto cell HeNBs, wherein in the following reference is made to macro eNBs (even though the invention is applicable also for HeNBs or a mixed up system comprising both macro eNBs and HeNBs). It is to be noted that the present invention is not limited to an application in such a system or environment but is also applicable in other communication systems, connection types and the like.

A basic system architecture of a communication network may comprise a commonly known architecture comprising a wired or wireless access network subsystem and a core network. Such an architecture comprises one or more access network control units, radio access network elements, access service network gateways or base transceiver stations, with which a UE is capable to communicate via one or more channels for transmitting several types of data. Furthermore, core network elements such as gateway network elements, AAA network elements, HSS network elements, policy and charging control network elements and the like are usually comprised. The general functions and interconnections of these elements are known to those skilled in the art and described in corresponding specifications so that a detailed description thereof is omitted herein. However, it is to be noted that there may be provided several additional network elements and signaling links used for a communication connection or a call between UEs and/or servers than those described in detail herein below.

Furthermore, the described network elements, such as a eNB or HeNB, a UE and the like, and their functions described herein may be implemented by software, e.g. by a computer program product for a computer, or by hardware. In any case, for executing their respective functions, correspondingly used devices and network element may comprise several means and components (not shown) which are required for control, processing and communication/signaling functionality. Such means may comprise, for example, a processor unit for executing instructions, programs and for processing data, memory means for storing instructions, programs and data, for serving as a work area of the processor and the like (e.g. ROM, RAM, EEPROM, and the like), input means for inputting data and instructions by software (e.g. floppy diskette, CD-ROM, EEPROM, and the like), user interface means for providing monitor and manipulation possibilities to a user (e.g. a screen, a keyboard and the like), interface means for establishing links and/or connections under the control of the processor unit (e.g. wired and wireless interface means, an antenna, etc.) and the like.

As described above, the proposed mechanism for providing and using the communication information set (URLM) used for interference considerations in multi-component carrier systems is useful in particular, for example, in case of using dynamic frequency re-use mechanisms, such as ACCS schemes, wherein the communication information set may be related uplink related information.

In an example for an ACCS scheme implemented, for example, in an LTE or LTE-A based communication network, which is used in the following as an implementation example for embodiments of the present invention, each cell (i.e. eNB or HeNB) automatically selects one (and only one) of the component carriers as its primary component carrier (PCC) (also sometimes called the base carrier) when the eNB is powered on. To all intents and purposes, the primary/base component carrier is assumed to have full cell coverage. The primary/base CC is assumed to be used for initial connection of terminals in the cell. Consequently, the related ACCS scheme puts strong emphasis on assuring the quality of primary/base component carriers. However, any changes or reconfigurations of these component carriers are to be as infrequent as possible.

Depending on the offered traffic in a cell and the mutual interference coupling with the surrounding cells, transmission/reception on all component carriers may not always be the best solution. Therefore, each cell (eNB) may dynamically select additional component carriers for transmission/reception as well. This is also referred to as selection of secondary component carriers (SCC) (also some-times called extended carriers). Whereas PCCs provide reliable full cell coverage, the main purpose of SCCs is to provide additional cell capacity whenever needed and feasible. Component carriers not selected for PCC or SCC are completely muted (uplink/downlink) and not used by the cell.

For providing information about the present interference situation and for assisting the selection of component carriers as the PCC or SCC, it is proposed that each eNB maintains a so-called background interference matrix (BIM), which basically expresses the interference coupling with neighboring cells. The BIM is built locally by each eNB based on measurements from the terminals that are served by the eNB (i.e. served UEs, for example).

For example, the BIM is usable in the following manner. Once it is detected that the offered traffic for one eNB requires more bandwidth (i.e. more SCCs), following information sources may be used to determine if it can be allowed to allocate a specific CC or a group of CCs:

Radio resource allocation table (RRAT)
Background interference matrix (BIM)

The RRAT is a table expressing which CCs are used by the surrounding eNBs. Hence, the RRAT is based on information from the surrounding eNBs. Additionally, it is indicated which CC is used as a PCC or as a SCC.

Regarding the BIM, each cell (eNB) maintains information on all the potential interfering cells and a corresponding conditional C/I value, which is also referred to as incoming BIM. The C/I value is a measure of mutual interference coupling between a pair of cells, in case the interfered cell and the interfering cell use the same CC simultaneously. This value may be estimated as follows. For each active UE connected to the cell, RSRP measurements are reported. These measurements are conducted both towards the serving cell and the surrounding cells. The conditional C/I, expressed in decibel, describe the RSRP difference between the serving cell and the surrounding cells. Hence, based on the RSRP measurements reported from the different UEs, an empirical C/I distribution can be built locally within each eNB. The C/I value stored in the BIM for each surrounding cell is the value corresponding to a certain outage of e.g. 90%. The values in the locally stored BIM can be updated either periodically or event based.

In order to communicate information regarding CC selection, according to present ACCS schemes, the eNB may asynchronously/synchronously or periodically broadcast their (RRAT), which may include information on the occupied CCs, their use as PCC or SCC, their use for DL and/or UL traffic, TX power and IoT levels and possibly other time-frequency averaged traffic information per CC if needed. The RRAT messages may be in-frequently broadcasted and provide only an average time-frequency status of the resource utilization.

Thus, the ACCS scheme described above provides an automatic and fully distributed mechanism for re-configurable frequency re-use on a component carrier resolution e.g. for LTE-A based networks. In principle, each component carrier is eligible for use in any cell provided that certain average signal-to-interference-plus-noise ratio (SINR) constraints are satisfied.

As indicated above, in order to ensure the long-term 'quality' of the radio link e.g. on the PCC (maximum tolerable inter-cell interference) and to minimize a corresponding reconfiguration frequency as much as possible, while still providing full cell coverage, it is necessary to provide suitable radio monitoring and CC recovery procedures, wherein such procedures have to be performed for both DL and UL PCC traffic.

With regard to DL traffic, the following solution can be used. Each eNB can configure its served UEs to monitor and report back the RX (receiver) signal level for a given set of neighboring cells. This information may then be aggregated from all UEs served on the PCC (from the incoming DL BIM), and combined with information received from the RRAT of other eNBs. Thus, it is possible to provide a suitable statistical description of the interfering sources/eNBs (HeNBs) on the PCC. Therefore, the (own) eNB may initiate for example an interference reduction request procedure towards the identified neighboring eNBs in order to protect the transmissions on its own PCC.

However, as also indicated above, the situation for UL traffic is different and requires such another way of solution. This is caused, for example, due to the distributed nature of the interference, originating from all the UEs served by the neighboring eNBs. The IDs of these UEs are known only in their own serving eNBs and the limited signaling between eNBs prevents the detailed per-UE information to be exchanged in the entire network of deployed eNBs. Thus, a suitable generation of the UL interference characterization (and incoming UL BIM) requires provision of further information.

For this purpose, according to examples of embodiments of the invention, a mechanism is proposed comprising a method, an apparatus and a corresponding computer program product by means of which information can be generated and used for estimating and identifying at each eNB (also referred to also as own eNB, i.e. the network element where the corresponding process is executed) the set of eNBs (also referred to as other or foreign eNBs or network elements) generating the UL interference on certain monitored CC, i.e. information for the generation of e.g. the incoming UL BIM. The mechanism comprising such a method, apparatus and computer program product provides thus a distributed and scalable rule for indicating a communication information set informing about an average (time/frequency) and aggregated (over all or group of served UEs) UL load measure per CC (referred to as URLM), a distributed and scalable signaling of the communication information set, i.e. the URLM, by means of suitable signaling, e.g. the broadcasted RRAT messages used in the ACCS concept, an aggregation procedure for the received URLM information at each eNB in order to determine and build the incoming UL BIM, and the usage of the thus determined incoming UL BIM to initiate necessary measures, such as PCC recovery procedures and/or SCC (re-) selection procedures and/or SCC coalition formation procedures.

It is to be noted that the presented methods are equally valid for UL interference monitoring and handling on PCC, SCCs or any groups of CCs (in case there are several grouped CCs and interference measures are conducted for the groups of CCs), wherein for the sake of simplicity the following description refers (mainly) to an explanation in a PCC case.

In FIG. 1, a simplified example of a communication network architecture including base transceiver station according to examples of embodiments of the invention is shown. It is to be noted that the network architecture shown in FIG. 1 depicts only those network elements which are useful for understanding the principles of the examples of embodiments of the invention. As known by those skilled in the art there are several other network elements involved in the establishment, control and management of a communication connection which are omitted here for the sake of simplicity.

Furthermore, with regard to links or interfaces between the network elements shown in FIG. 1, the indications provided in FIG. 1 represent only examples for such links. Other definitions or links providing similar functionality may be also used.

Referring to FIG. 1, reference signs 10, 20 and 30 denote base transceiver stations, such as eNBs, representing examples of access points for a respective cell 11, 21, or 31 indicated by a dashed circle. Specifically, reference sign 10 denotes an eNB#1 which is used hereinafter as the own eNB, i.e. the base transceiver station used as a reference point for the execution of the processings according to examples of embodiments of the invention. It is to be noted that the eNBs 20 and 30 (indicated as eNB#2 and eNB#3), which are referred to hereinafter as other or foreign eNBs, may be also configured to execute corresponding processings.

Reference signs 11 and 12, 22 and 23, and 32 and 33 denote respective UEs being served by the corresponding eNB in whose cell they are located.

Thus, FIG. 1 shows an example of ACCS scenario with three eNBs. As further indicated in FIG. 1, each eNB receives specific signaling from the UEs located/served in its cell and also from other cells (for example via signaling from the respective other eNB). These signalings may comprise, for example, UL signal per UE and per CC of the own served UEs (indicated by solid arrows), broadcasted or point-to-point RRAT from other eNBs, broadcasted or point-to-point load and/or interference indicators from other eNBs, etc. Thus, each eNB 10, 20 and 30 performs autonomously DL & UL measurements on its used CCs. On the basis of these information, the URLM (the communication information set) is created or determined, which will be described below in further details and which is indicated in FIG. 1 by corresponding dashed boxes for each eNB.

For UL BIM aggregation purposes, the determined URLM is sent to other eNBs, for example by means of the broadcast RRAT message, per each CC or group of CCs (e.g. the PCC). This is indicated in FIG. 1 by corresponding solid boxes at each eNB 10, 20 and 30.

Figure 2:
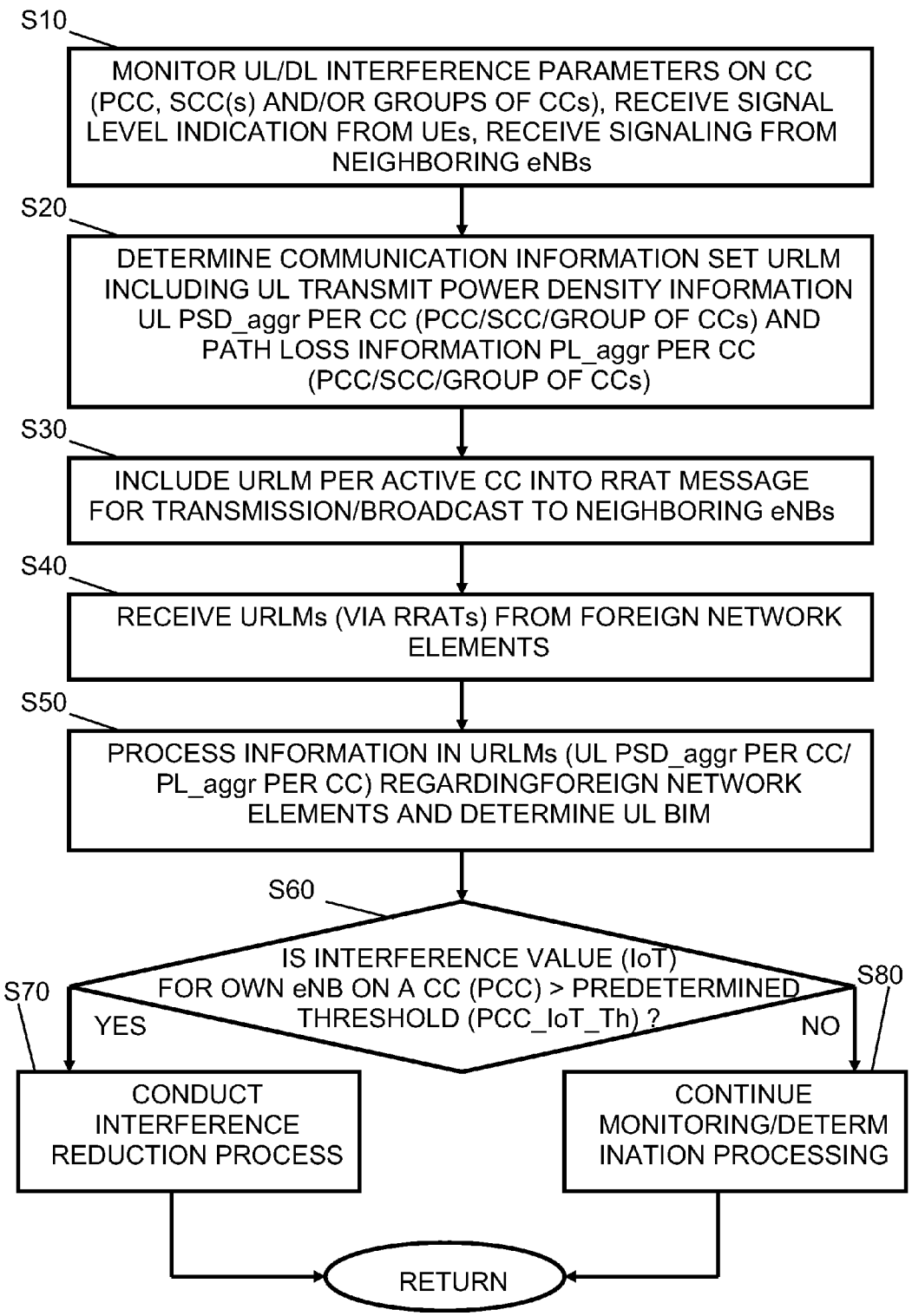
FIG. 2 shows a flow chart illustrating a procedure for generating and using a communication information set related to interference provided according to examples of embodiments of the invention.

In the following, an example of an embodiment of the invention regarding a procedure for generating and using a communication information set (URLM) related to interference is described with reference to a flow chart shown in FIG. 2. Specifically, FIG. 2 shows a procedure for determining/creating the URLM in an own eNB (e.g. eNB#1 according to FIG. 1) and for using corresponding information from other eNBs to determine the UL BIM which in turn is used for a decision regarding the necessity to execute another processing, such as an interference reduction processing on a specific CC or the like. Hence, the procedure shown in FIG. 2 may be executed, for example, by the eNB 10 (but equivalently in the other eNBs 20 and 30 with correspondingly other parameters), but also other network elements may execute corresponding measures, such as a base transceiver station like a HeNB or the like.

In step S10, the eNB 10 monitors autonomously DL and UL interference parameters on their CCs, such as the PCC (corresponding interference parameters may be monitored also on SCC or groups of CCs, if established). For example, in addition to the incoming DL BIM which may be determined as described above, DL interfering RX signal levels reported by the served UEs 12 and 13 are received. Furthermore, signal level indications from served UEs related to TX and/or RX power values are received, and signaling, such as RRAT, received from other eNBs are considered.

In step S20, the received signals and values are used to determine the communication information set, i.e. the URLM. For example, there is estimated an aggregated pathloss value, PL_aggr, per CC or group of CCs towards each of the neighboring eNBs 20 and 30 on the basis of the incoming DL BIM and the DL interfering RX signal levels reported by the served UEs 12 and 13. In this connection, it is assumed that actual DL TX power levels per CC (or group of CCs) per eNB cell are included in the broadcast RRAT messages from these eNBs. Furthermore, the eNB 10 estimates autonomously an average aggregated UL transmit power density, PSD_aggr, per CC or group of CCs. This may be done, for example, on the basis of values aggregated from all UEs served in the CC (UEs 12 and 13). Additionally or alternatively, information stored in the eNB may be used for this purpose, for example if only open loop transmit power control is used for a UE, wherein the UL PSD per such a UE may be known at the eNB 10, since the eNB 10 may have then set the UL power control parameters, such as Po and alpha.

In the following, an exemplary processing for estimating or calculating information elements of the communication information set (e.g. elements described above to be included in the URLM) according to one example of embodiments of the invention is described with reference to the network elements depicted in FIG. 1.

The UEs 12 and 13 are assumed to be served at eNB 10 in UL on a CC_k with allocated time-averaged bandwidth BW_UE12 and BW_UE13, respectively. The CC_k has a total bandwidth of BW_C_k, and $$BW\_UE12+BW\_UE13>BW\_CC\_k \quad (eq.\ 1)$$

Furthermore, time-averaged UL transmit power levels PTx are referred to as PTx_UE12 and PTx_UE13 with regard to the UE12 and UE13 on CC_k, respectively. According to examples of embodiments of the invention, these values (or equivalently the UL PSD of each UE) are assumed to be controlled and estimated by the serving eNB 10. The result is therefore:

$$PTx\_UE12=PSD\_UE12*BW\_UE12 \quad (eq.\ 2)$$

$$PTx\_UE13=PSD\_UE13*BW\_UE13 \quad (eq.\ 3)$$

As indicated in connection with FIG. 1, the UE 12 and UE 13 report back to the eNB 10 DL RSRP (or similar) measurements on CC_k for the other cells of eNB 20 and eNB 30. These measurements may be used to determine (in the eNB 10) the (approximate) path loss values between the UEs served by the eNB 10 and the other eNBs 20 (eNB#2) and 30 (eNB#3), i.e. PL_UE12 eNB#2, PL_UE12 eNB#3, PL_UE13 eNB#2 and PL_UE13 eNB#3, respectively.

As an information element of the URLM, the PSD_Aggr for the CC_k may be calculated as:

$$PSD\_Aggr\_CC\_k=(PTx\_UE12+PTx\_UE13)/BW\_CC\_k \quad (eq.\ 4)$$

On the other hand, as another information element of the URLM, the PL_Aggr towards the eNB 20 for the CC_k may be estimated as:

$$PL\_aggr\_eNB\#2\_CC\_k= \\ (PTx\_UE12*PL\_UE12\_eNB\#2+ \\ PTx\_UE13*PL\_UE13\_eNB\#2)/(PTx\_UE12+ \\ PTx\_UE13) \quad (eq.\ 5)$$

Similarly, the PL_Aggr towards eNB 30 for CC_k may be estimated as:

PL_aggr_eNB#3_CC_k=
    (PTx_UE12*PL_UE12_eNB#3+
    PTx_UE13*PL_UE13_eNB#3)/(PTx_UE12+
    PTx_UE13)        (eq. 6)

For example, when eNB 20 receives the communication information from eNB#1 (i.e. eNB 10), it may use the information pair {PSD_Aggr_CC_k, PL_aggr_eNB#2 CC_k} to estimate a time-averaged UL interference power level received from the UEs served by eNB 10 on a given bandwidth within CC_k, which is considered as BW_Alloc_eNB#2_CC_k<BW_CC_k:

UL_IPw_eNB#1_eNb#2=PSD_Aggr_CC_
    k*BW_Alloc_eNB#2_CC_
    k*PL_aggr_eNB#2_CC_k        (eq. 7)

In the example above, the information pair {PSD_Aggr_CC_k, PL_aggr_eNB#2_CC_k} allows eNB 20 to estimate the received interference from eNB 10 on any bandwidth within the total bandwidth of the CC_k, thus potentially enabling a more selective interference aware scheduling of the UE 22 and UE 23.

It is of course possible that the other base transceiver stations (eNBs 10 to 30) conduct corresponding calculations/estimations with correspondingly changed parameters. Alternatively to the above, according to a further example of embodiments of the invention, the information elements, such as for example a pair like {PSD_Aggr_CC_k, PL_aggr_eNB#2_CC_k} may be compressed to a single value calculated in the eNB 10 indicating the total time-averaged interference power (referred to as UL_IPw_eNBx_eNBy) on the full bandwidth of the CC_k. This may be done, for example, by:

UL_IPw_eNB#1_eNB#2=PSD_Aggr_CC_
    k*BW_CC_k*PL_aggr_eNB#2_CC_k        (eq. 8)

or alternatively by:

UL_IPw_eNB#1_eNB#2=PTx_UE12*PL_
    UE12_eNB#2+PTx_UE13*PL_UE13_eNB#2        (eq. 9)

Furthermore, according to further examples of embodiments of the invention, the eNBs 10, 20, 30 may implement an algorithm where only certain UEs are selected for the processing in Eq. 4 to 6. Such algorithms may be based, for example, on their determined RSRP towards their own serving cell.

Additionally, according to further examples of embodiments of the invention, the processing in eq. 4 to 6 may also be performed over a group of several (frequency contiguous or non-contiguous) CCs. In this case the communication information set may include additionally the identification of the CCs in the selected grouping.

As a further example of embodiments of the invention regarding the calculation/estimation of information elements to be used in the communication information set, for example, also the following processing may be executed.

A value indicating an UL interference power from all UEs u in a cell m received at an eNB in a cell n (e.g. eNB 10) in a frequency range [fl(k), fu(k)] of a component carrier k may be calculated by the following equation:

$$P_{Intf,UL}(m, n, k) = \sum_{u \in \{UE(m)\}} \int_{fl(k)}^{fu(k)} pL_{UL}(u, n, f) p_{UL}(u, f) df \quad \text{(eq. 10)}$$

wherein $pL_{UL}(u, n, f)$ is the path loss for an UL transmission from an UE u to the eNB of cell n for a frequency f, and $p_{UL}(u, f)$ is a spectral power density emitted from the UE u at the frequency f.

According to an example of embodiments of the invention, a constant path loss $pL_{UL}(u, n, f)=pL_{UL,k}(u, n)$ within the whole frequency range of the CC_k between the UE u and the eNB of cell n (e.g. eNB 10) may be assumed. Then, equation 10 results in the following:

$$P_{Intf,UL}(m, n, k) \approx \sum_{u \in \{UE(m)\}} pL_{UL,k}(u, n) \int_{fl(k)}^{fu(k)} p_{UL}(u, f) df \quad \text{eq. 11}$$

$$= \sum_{u \in \{UE(m)\}} pL_{UL,k}(u, n) P(u, k)$$

wherein P(u, k) denotes the total power transmitted from the UE u in the CC_k. It is to be noted that eq. 11 is basically equivalent to eq. 9.

According to a further example of embodiments of the invention, it may be furthermore assumed that there exists a mapping function which allows to calculate the UL path loss $pL_{UL,ku}(u, n)$ from the UE u to the eNB of the cell n for a CC ku employed for UL transmission from the path loss value $pL_{DL,kd}(n, u)$ for a CC kd employed for DL transmission from the eNB of cell n to the UE u.

Figure 3B:
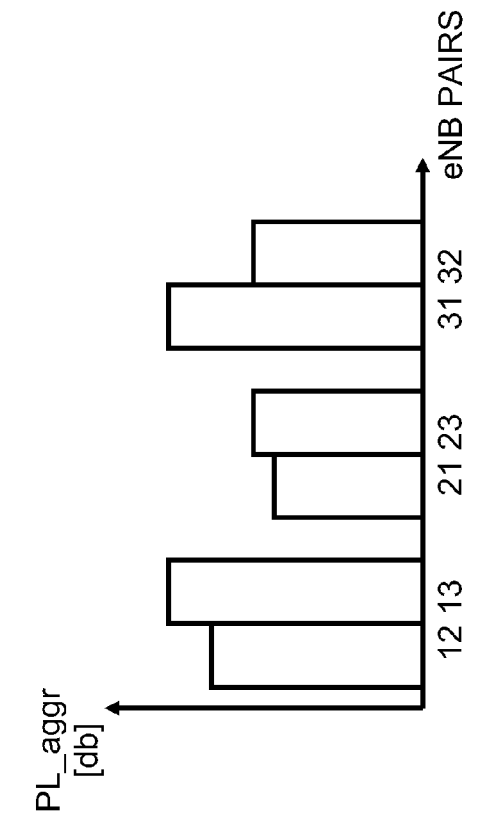
FIGS. 3a and 3b show diagrams illustrating schematically information elements included in the communication information set according to examples of embodiments of the invention.
Figure 3A:
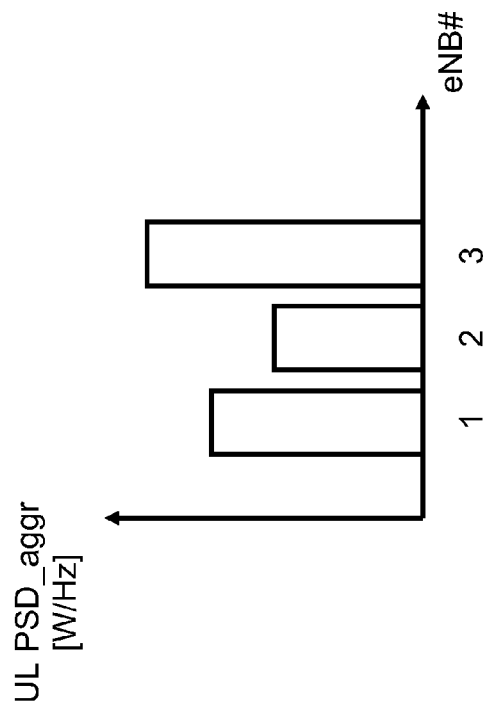

FIGS. 3a and 3b show diagrams illustrating schematically corresponding information elements of the URLM, i.e. the PL_aggr and the PSD_aggr estimated by the UE 10 in accordance with step S20.

Specifically, FIG. 3a illustrates different aggregated UL PSD values which are estimated, for example, on the basis of a calculation according to Eq. 4, for example in W/Hz, towards each of the eNB 10 (eNB#1) shown at the left side of the diagram, the eNB 20 (eNB#2) shown at the middle of the diagram, and the eNB 30 (eNB#3) shown at the right side of the diagram. The depicted quantities of the respective UL PSDs represent only illustrative examples and may be changed by time or in other deployment scenarios, of course.

On the other hand, FIG. 3b illustrates different aggregated path loss (PL) values, for example in db, i.e. path loss information between the UEs in a cell and a neighbouring eNB which are estimated, for example, on the basis of a calculation according to Eq. 5 or 6. The path loss relation between the UEs served by eNB 10 (eNB#1) and eNB 20 (eNB#2) or eNB 30 (eNB#3) is shown at the left side of the diagram, the path loss relation between the UEs served by eNB 20 (eNB#2) and eNB 10 (eNB#1) or eNB 30 (eNB#3) is shown at the middle of the diagram, and path loss relation between the UEs served by eNB 30 (eNB#3) and eNB 10 (eNB#1) or eNB (eNB#2) is shown at the right side of the diagram. Again, the depicted quantities of the respective PL values represent only illustrative examples and may be changed by time or in other deployment scenarios, of course.

After determining the communication information set or URLM in step S20, which includes for example the PL_aggr and PSD_aggr per (active) CC or group of CCs, the URLM is included in step S30 into a suitable message to be sent towards the other eNBs 20 and 30, for example in the RRAT message which is broadcasted as described above.

In the following, the processing of using or handling communication information sets (URLMs) received from foreign network elements (e.g. eNBs 20 and 30) in the own eNB (eNB 10) is described.

In step S40, URLMs from the other eNBs 20 and/or 30 are received by means of corresponding RRAT messages, for example.

In step S50, based on a processing of the URLM information received from the other eNBs 20 and 30, the own eNB 10 determines autonomously the principal source-eNB of the average UL interference on its CCs. For example, the incoming UL BIM is determined. This may be done, for example, by multiplying specific pairs of values of the PL_aggr and PSD_aggr per (active) CC information elements. Specifically, the eNB#1 may determine for its PCC whether P2×L21 is lower or higher than P3×L31 (P is related to the PSD values and L is related to the PL values). Correspondingly, the eNB#2 may determine for its PCC whether P1×L12 is lower or higher than P3×L32, while the eNB#3 may determine for its PCC whether P1×L13 is lower or higher than P2×L23.

In step S60, the eNB 10 monitors the UL interference level and its main interfering eNB on the PCC. For example, it is determined in step S60 whether a selected interference level, for example the IoT for the eNB 10 on e.g. the PCC is higher than an allowed predetermined threshold (e.g. a threshold for the Iot on the PCC, PCC_IoT_Th). It is to be noted that of course also other parameters besides the IoT may be used for the determination in step S60.

In case the determination is positive in step S60 (i.e. IoT of eNB 10 on PCC>PCC_IoT_Th), step S70 is executed where a suitable interference related processing is conducted. For example, in step S70, the strongest source of interference is identified from the UL BIM (e.g. eNB 30) and an interference reduction request (IRR) is sent to the identified source (eNB 30). Alternatively, other CC recovery procedures for the PCC may be executed. In case the CC in question is an SCC, an SCC (re-)selection procedure may be executed in step S70, and/or an SCC coalition formation procedure may be executed. Generally, according to examples of embodiments of the invention, an interference related processing on a specific CC is performed.

Otherwise, in case the determination is negative in step S60 (i.e. IoT of eNB 10 on PCC<PCC_IoT_Th), step S70 is executed where the monitoring of PCC related parameters and of the UL BIM is continued.

Then, the procedure returns, for example if new RRATs with other URLM are received, or in case a predetermined time elapsed.

FIG. 4 shows a diagram illustrating a configuration of a network device, such as the eNB 10 executing a procedure for generating and using a communication information set (URLM) related to interference as described in connection with FIG. 2.

It is to be noted that the eNB 10 shown in FIG. 4 may comprise several further elements or functions besides those described in connection therewith but which are omitted herein for the sake of simplicity as they are not essential for understanding the invention.

The eNB10 20 may comprise a processing function or processor 101, such as a CPU or the like, which executes instructions given by programs or the like related to the power control. The processor 101 may comprise further portions dedicated to specific processings described below. Portions for executing such specific processings may be also provided as discrete elements or within one or more further processors, for example. Reference signs 102 and 103 denote transceiver or input/output (I/O) units connected to the processor 101 (or corresponding other elements comprising the functions of the further portions). The I/O unit 102 may be used for communicating with UEs via an air interface. The I/O unit 103 may be used for communicating with other network elements like other eNBs (the eNBs 20 and 30, for example) via corresponding interfaces, such as wired interfaces and wireless interfaces. The I/O units 102 and 103 may be a combined unit comprising the communication equipment towards all network elements in question, or may comprise a distributed structure with a plurality of different interfaces. Reference sign 104 denotes a memory usable, for example, for storing data and programs to be executed by the processor 101 and/or as a working storage of the processor 101.

The processor 101 is configured to execute processings related to the generation and usage of communication information sets (the URLM) as described in examples of embodiments of the invention. For example, the processor 101 comprises a monitoring and/or detection portion 111 used for monitoring uplink and downlink interference parameters per CC of the eNB 10, for detecting or retrieving power related parameters, and for determining further information required for generating the URLM (according to step S10 of FIG. 2). Furthermore, the processor 101 comprises an URLM determination portion 112 for determining or generating on the basis of information obtained by the monitoring/detection portion 111 the URLM (the communication information element) comprising, for example, the aggregated path-loss value, PL_aggr, per CC towards each of the neighboring eNBs and the average aggregated UL transmit power density, PSD_aggr, per CC (according to step S20 of FIG. 2). Reference sign 113 denotes an RRAT transmission/receiving portion which is used on one hand to include the URLM of the URLM determination portion into a RRAT message to be transmitted towards other network elements (eNBs 20 and 30) and to retrieve from received RRAT messages coming from other network elements respective communication information sets (URLMs). It is to be noted that the functions of the RRAT transmission/receiving portion 113 may be done also by separated processing portions.

When communication information sets (URLMs) are received and extracted by the RRAT transmission/receiving portion 113, an UL BIM determination portion 114 determines uplink background interference information (i.e. the incoming UL BIM) (according to step S50 of FIG. 2). In an interference monitoring and decision portion 115, it is determined whether an interference situation on a CC is present requiring a further interference related processing (according to step S60 of FIG. 2). If such an interference situation is decided to be present, in an interference reduction portion 116, a suitable interference related processing is executed (in accordance with step S70 of FIG. 2) comprising, for example, a transmission of an interference reduction request (IRR), an CC recovery procedure, an SCC (re-) selection procedure, and/or an SCC coalition formation procedure.

By means of the described mechanism for providing information, i.e. the URLM usable for interference considerations in multi-component carrier systems, it is possible to provide mid-term and/or long-term information whose signaling does not require significant bandwidth. Therefore, the implementation of examples of embodiments of the invention is feasible also for the case of Over the Air Communication (OTAC) schemes.

Furthermore, according to a further example of embodiments of the invention, the information elements of the communication information set (URLM), such as the PSD_aggr and PL_aggr values, may be included in the message to be transmitted to the other (foreign) network elements, such as the RRAT message, in a quantized form following a specified rule. For example, instead of quantizing the full values, only a given range is indicated based on pre-defined PSD and PL thresholds (similar to standardized RSRP or RSRQ reports).

Thus, it is possible to further decrease the size of the URLM and thus the quantity of data to be transmitted as well as the load for processing the information contained in the URLM.

In above described examples of embodiments of the invention, the communication information set, i.e. the URLM information, as well as the background interference information retrieved therefrom, i.e. the incoming UL BIM, are described to be used in connection with PCC considerations. However, according to further examples of embodiments of the invention, corresponding information (URLM and UL BIM, for example) may also generated and used in a corresponding manner for other CC allocation cases, such as UE-group specific UL SCC allocation, as an additional feature in an ACCS mechanism, for example.

According to further examples of embodiments of the invention, the proposed mechanism for generating the communication information element (the URLM) may be extended by including additionally extra dimensions or adding further information. For example, at least one of a cell-edge load indicator and a cell-average load indicator may be included for providing a more detailed overview regarding the situation to be handled. Furthermore, other combinations or parameters may also be added alternatively or additionally, which may depend, for example, on the actual signaling bandwidth available for the communication with the other (foreign) network elements/eNBs (i.e. resources available for RRAT messages, for example).

In the above described examples of embodiments of the invention, a usage of the proposed mechanism in connection with a LTE or LTE-A based communication network was discussed. However, according to further examples of embodiments of the invention, a corresponding mechanism may also be used in other cooperative and self-organized systems, where the concept of utilizing capacity estimations based on prior system performance characterization enables a simple algorithm within the interference mitigation/management schemes aiming at fair and efficient resource (re-) distribution.

According to further examples of embodiments of the invention, it is assumed that at least some or preferably all of the UEs located in each cell/eNB are configured to report RSRP/RSRQ for neighboring cells on all active CCs (PCC and SCCs) or group of CCs. Furthermore, according to further examples of embodiments of the invention, the allocated or used DL and UL SCC for a given served UE may not be in the same frequency band as the PCC or another SCC, wherein the mechanism for generating the communication information element (the URLM) is adapted so as to consider the frequency band belonging when determining the URLM, in particular when estimating the PL_aggr information element, for example.

Moreover, according to further examples of embodiments of the invention, the mechanism for generating and using the communication information element (the URLM) may use another communication path instead of RRAT messages for signaling the communication information set, for example another existing message mechanism or even an own separate message. Furthermore, the respective message may be transmitted by using wired or wireless based transmission mechanisms between base transceiver stations or other related network nodes. Moreover, the message may be broadcasted or be transmitted by a point-to-point transmission.

According to further examples of embodiments of the invention, there is provided an apparatus comprising detecting means configured to monitor uplink and downlink interference parameters on at least one specified component carrier used by an own base transceiver station of a communication network, and processing means configured to determine a communication information set indicating an uplink load measure for each of the at least one specified component carrier, the communication information set comprising information elements based on the monitored interference parameters and on transmission power values. Furthermore, this apparatus may further comprise receiving means configured to receive, at the own base transceiver station, at least one communication information set indicating an uplink load measure for each of at least one component carrier used by a foreign base transceiver station, and processing means configured to process the received at least one communication information set, and to determine uplink background interference information on the basis of the processing.

For the purpose of the present invention as described herein above, it should be noted that an access technology via which signaling is transferred to and from a network element or node may be any technology by means of which a node can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto, usable access networks may be any device, apparatus, unit or means by which a station, entity or other user equipment may connect to and/or utilize services offered by the access network; such services include, among others, data and/or (audio-) visual communication, data download etc.;

a user equipment may be any device, apparatus, unit or means by which a system user or subscriber may experience services from an access network, such as a mobile phone, personal digital assistant PDA, or computer;

method steps likely to be implemented as software code portions and being run using a processor at a network element or terminal (as examples of devices, apparatuses and/or modules thereof, or as examples of entities including apparatuses and/or modules for it), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

devices, apparatuses, units or means can be implemented as individual devices, apparatuses, units or means, but this does not exclude that they are implemented in a distributed fashion throughout the system, as long as the functionality of the device, apparatus, unit or means is preserved, an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

As described above, there is proposed a mechanism by means of which information can be generated and used for estimating and identifying at each base transceiver station of a communication network the set of other base transceiver stations generating interference on certain monitored component carriers used by the base transceiver station, i.e. information for the generation of the incoming uplink background interference matrix. For this purpose, a specific communication information set, referred to as uplink radio load map, is determined which informs about an average (time/frequency) and aggregated (over all or group of served UEs) uplink load measure per component carrier. Based on the uplink radio load map received via suitable signaling from other base transceiver stations, each base transceiver station can determine the incoming uplink background interference matrix and initiate, if necessary, suitable measures for reducing interference per component carrier.

Although the present invention has been described herein before with reference to particular embodiments thereof, the present invention is not limited thereto and various modifications can be made thereto.

The invention claimed is:

1. A method comprising:
monitoring uplink and downlink interference parameters on at least one specified component carrier used by a base transceiver station of a communication network;
determining a communication information set indicating an uplink load measure for each of the at least one specified component carrier, the communication information set comprising information elements based on the monitored interference parameters and on transmission power values; and
providing the information elements of the communication information set in a quantized format, wherein each of the quantized information elements indicates a preset range of values of a totality of values estimated,
wherein the determining further comprises:
executing an estimation of an average aggregated uplink transmit power density for each of the at least one specified component carrier, wherein
the estimation of the average aggregated uplink transmit power density is based on at least one of information aggregated from user equipments served by the base transceiver station, and power control parameter information stored in the base transceiver station.

2. The method according to claim 1, wherein
the determining further comprises
executing an estimation of an aggregated path loss value towards neighboring base transceiver stations for each of the at least one specified component carrier, wherein
the estimation of the aggregated path loss value is based on at least one of incoming downlink background interference information received from the neighboring base transceiver stations and downlink interfering receiver signal levels reported by user equipments served by the base transceiver station.

3. The method according to claim 1, further comprising
transmitting the communication information set from the base transceiver station to neighboring base transceiver stations, and
including, for transmitting the communication information set from the base transceiver station to neighboring base transceiver stations, the communication information set in a message used for informing about a radio resource allocation of the base transceiver station.

4. The method according to claim 1, further comprising
receiving, in the base transceiver station, at least one communication information set indicating an uplink load measure for each of at least one component carrier used by a foreign base transceiver station,
processing the received at least one communication information set, and
determining uplink background interference information on the basis of the processing.

5. A computer program product for a computer, comprising a non-transitory computer readable medium comprising software code portions for performing the method of claim 1 when said product is run on the computer.

6. An apparatus comprising:
at least one processor; and
at least one memory including computer program code,
the at least one memory and the computer program code configured to, with the at least one processor, cause the apparatus to perform at least the following:
monitoring uplink and downlink interference parameters on at least one specified component carrier used by an base transceiver station of a communication network;
determining a communication information set indicating an uplink load measure for each of the at least one specified component carrier, the communication information set comprising information elements based on the monitored interference parameters and on transmission power values; and
quantizing the information elements of the communication information set, wherein each of the quantized information elements indicates a preset range of values of a totality of values estimated,
wherein the determining further comprises:
executing an estimation of an average aggregated uplink transmit power density for each of the at least one specified component carrier, wherein
the estimation of the average aggregated uplink transmit power density is based on at least one of information aggregated from user equipments served by the base transceiver station, and power control parameter information stored in the base transceiver station.

7. The apparatus according to claim 6, wherein the determining further comprises:
executing an estimation of an aggregated path loss value towards neighboring base transceiver stations for each of the at least one specified component carrier, wherein the estimation of the aggregated path loss value is based on at least one of incoming downlink background interference information received from the neighboring base transceiver stations and downlink interfering receiver signal levels reported by user equipments served by the base transceiver station.

8. The apparatus according to claim 6, wherein the at least one memory and the computer program code are further configured to, with the at least one processor, cause the apparatus to perform at least the following: determine indicators related to a cell edge load and a cell-average load of the base transceiver station, and include the indicators in the communication information set.

9. The apparatus according to claim 6, further comprising a transmitter configured to transmit the communication information set from the base transceiver station to neighboring base transceiver stations, wherein
the transmitter is configured to including, for transmitting the communication information set from the base transceiver station to neighboring base transceiver stations, the communication information set in a message used for informing about radio resource allocation of the base transceiver station.

10. The apparatus according to claim 6, further comprising a receiver configured to receive, at the base transceiver station, at least one communication information set indicating an uplink load measure for each of at least one component carrier used by a foreign base transceiver station, and
wherein the at least one memory and the computer program code are further configured to, with the at least one processor, cause the apparatus to perform at least the following:
process the received at least one communication information set, and
determine uplink background interference information on the basis of the processing.

11. A method comprising:
monitoring uplink and downlink interference parameters on at least one specified component carrier used by a base transceiver station of a communication network;
determining a communication information set indicating an uplink load measure for each of the at least one specified component carrier, the communication information set comprising information elements based on the monitored interference parameters and on transmission power values;
including in the communication information set indicators related to a cell edge load and a cell-average load of the base transceiver station; and
quantizing the information elements of the communication information set, wherein each of the quantized information elements indicates a preset range of values of a totality of values estimated,
wherein the determining further comprises:
executing an estimation of an average aggregated uplink transmit power density for each of the at least one specified component carrier, wherein
the estimation of the average aggregated uplink transmit power density is based on at least one of information aggregated from user equipments served by the base transceiver station, and power control parameter information stored in the base transceiver station.

12. The method according to claim 11, wherein the determining further comprises:
executing an estimation of an aggregated path loss value towards neighboring base transceiver stations for each of the at least one specified component carrier, wherein the estimation of the aggregated path loss value is based on at least one of incoming downlink background interference information received from the neighboring base transceiver stations and downlink interfering receiver signal levels reported by user equipments served by the base transceiver station.

13. The method according to claim 11, further comprising transmitting the communication information set from the base transceiver station to neighboring base transceiver stations, and
including, for transmitting the communication information set from the base transceiver station to neighboring base transceiver stations, the communication information set in a message used for informing about a radio resource allocation of the base transceiver station.

14. The method according to claim 11, further comprising
receiving, in the base transceiver station, at least one communication information set indicating an uplink load measure for each of at least one component carrier used by a foreign base transceiver station,
processing the received at least one communication information set, and
determining uplink background interference information on the basis of the processing.

15. A computer program product for a computer, comprising a non-transitory computer readable medium comprising software code portions for performing the method of claim 11 when said product is run on the computer.

16. An apparatus comprising:
at least one processor; and
at least one memory including computer program code,
the at least one memory and the computer program code configured to, with the at least one processor, cause the apparatus to perform at least the following:
monitoring uplink and downlink interference parameters on at least one specified component carrier used by a base transceiver station of a communication network;
determining a communication information set indicating an uplink load measure for each of the at least one specified component carrier, the communication information set comprising information elements based on the monitored interference parameters and on transmission power values;
including in the communication information set indicators related to a cell edge load and a cell-average load of the base transceiver station; and
quantizing the information elements of the communication information set, wherein each of the quantized information elements indicates a preset range of values of a totality of values estimated,
wherein the determining further comprises:
executing an estimation of an average aggregated uplink transmit power density for each of the at least one specified component carrier, wherein
the estimation of the average aggregated uplink transmit power density is based on at least one of information aggregated from user equipments served by the base transceiver station, and power control parameter information stored in the base transceiver station.

* * * * *